United States Patent
Sinnige

(10) Patent No.: US 8,968,870 B2
(45) Date of Patent: Mar. 3, 2015

(54) EMULSIONS FOR FIBREGLASS BINDER SYSTEMS

(75) Inventor: Laurence Anthony Sinnige, Niagara-on-the-Lake (CA)

(73) Assignee: Walker Industries Holdings Limited, Thorold (CA)

(*) Notice: Subject to any disclaimer, the term of this patent is extended or adjusted under 35 U.S.C. 154(b) by 123 days.

(21) Appl. No.: 13/018,948

(22) Filed: Feb. 1, 2011

(65) Prior Publication Data

US 2011/0190112 A1    Aug. 4, 2011

Related U.S. Application Data

(60) Provisional application No. 61/300,247, filed on Feb. 1, 2010.

(51) Int. Cl.
| | |
|---|---|
| *B32B 27/02* | (2006.01) |
| *B32B 27/30* | (2006.01) |
| *B32B 27/42* | (2006.01) |
| *B05D 3/02* | (2006.01) |
| *C09K 3/22* | (2006.01) |
| *D06M 15/41* | (2006.01) |
| *D06M 15/263* | (2006.01) |
| *B05D 7/00* | (2006.01) |
| *C03C 13/00* | (2006.01) |
| *C03C 13/06* | (2006.01) |

(52) U.S. Cl.
CPC . *B05D 7/00* (2013.01); *C03C 13/00* (2013.01); *C03C 13/06* (2013.01); *C09K 3/22* (2013.01)
USPC ........ 428/378; 428/364; 428/375; 427/385.5; 427/389.7; 427/389.9; 252/88.1; 8/115.6

(58) Field of Classification Search
None
See application file for complete search history.

(56) References Cited

U.S. PATENT DOCUMENTS

| | | | | |
|---|---|---|---|---|
| 2,424,831 | A | * | 7/1947 | Klaber ............... 106/18.12 |
| 2,566,716 | A | * | 9/1951 | Boe et al. ............... 524/501 |
| 2,872,427 | A | * | 2/1959 | Schroeder .............. 523/402 |
| 3,721,295 | A | * | 3/1973 | Bott ...................... 166/295 |
| 3,958,915 | A | * | 5/1976 | Noda et al. ................ 431/9 |
| 3,970,769 | A | * | 7/1976 | Kato et al. .............. 427/145 |
| 4,535,348 | A | * | 8/1985 | Iwakura et al. ......... 503/221 |
| 4,859,717 | A | * | 8/1989 | Hoskin et al. .......... 523/130 |
| 5,181,957 | A | * | 1/1993 | Gross et al. ............ 252/88.1 |
| 5,432,207 | A | * | 7/1995 | Rader .................... 521/128 |

FOREIGN PATENT DOCUMENTS

WO    WO 2009/046521 A1    4/2009

OTHER PUBLICATIONS

Fact Sheet: "Alternative Resin Binders for Particleboard, MDF & Wheatboard", by Healthy Building Network (May 2008).*
Product Information for Phenol, provided by Georgia Gulf (no date).*

* cited by examiner

*Primary Examiner* — Michael J Feely
(74) *Attorney, Agent, or Firm* — Santosh K. Chari; Leah Rodin; Blake, Cassels & Graydon LLP

(57) ABSTRACT

The present invention relates to an aqueous anti-dusting formulation for use in combination with a binder in the manufacture of fiber wool insulation, the formula comprising: a) oil; b) polyvinyl alcohol; and c) water. The invention further relates to a method for preparing a glass or mineral fiber product with the anti-dusting formulations and to products of the process.

15 Claims, 1 Drawing Sheet

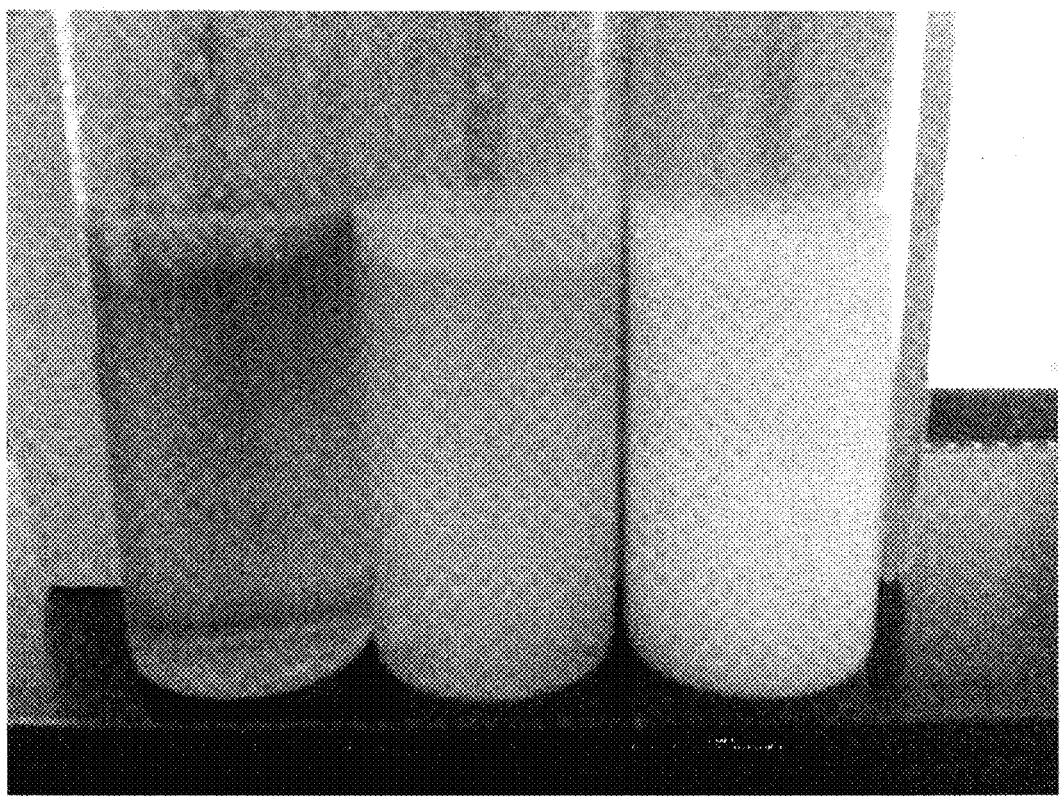

EMULSIONS FOR FIBREGLASS BINDER SYSTEMS

RELATED APPLICATION

This application claims the benefit of U.S. Provisional Application No. 61/300,247 filed on Feb. 1, 2010.

FIELD OF THE INVENTION

The present invention relates to anti-dusting formulations for use in the manufacture of fibre wool insulation. In particular the invention relates to anti-dusting formulations for use with fibreglass binder systems having low formaldehyde emissions.

BACKGROUND OF THE INVENTION

Fibreglass and mineral wool products are commonly used as insulating material in walls, attics and the like to protect against the elements. These products are available in different forms such as batts or blanket that can be placed for example in walls or attics or as loose material that can be blown in, to fill open air pockets in for example an attic.

In the manufacture of such fibre insulation it is common to apply a binder resin such as a thermoset binder resin to the fibre in order to adhere the fibres to one another. Phenolic resin, comprising aqueous phenol formaldehyde condensation products, are commonly used as binders.

Formaldehyde is known to be a strong irritant and an allergenic agent. Formaldehyde is known to cause serious ailments in humans ranging from irritation of skin, eyes, and lungs to triggering asthma. Formaldehyde has been classified as a carcinogen in humans by the State of California and the World Health Organization's International Agency for Research on Cancer.

Due to increasing concern regarding environmental and health impacts associated with formaldehyde resins, various resins have been developed to mitigate or avoid formaldehyde emissions. These new resins may be referred to as "eco" resins.

Another problem associated with fibreglass insulation is the formation of dust and fine glass particles that come lose from the fibre.

Anti-dusting formulations have been developed for use in the manufacture of fibreglass wool to reduce the amount of dust and glass particles released by these products. Pending application PCT/CA2008/001777, entitled "FORMULATION AND METHOD FOR DUST CONTROL OF FIBRE INSULATION" (the entire contents of which are incorporated herein by reference) was developed to address stability issues with known phenol formaldehyde binder systems used in the manufacture of fibreglass insulation.

Although known emulsion formulations, such as those taught in PCT/CA2008/001777, exhibit long term stability with formaldehyde based resins, emulsions formed in the same manner using the new binder systems having lower formaldehyde emissions do not. Therefore a solution is needed to be able to incorporate dust suppressing additives to these new binders.

SUMMARY OF THE INVENTION

According to one aspect, the invention provides an aqueous anti-dusting formulation for use in combination with a binder in the manufacture of fibre wool insulation, the formula comprising:

a) oil;
b) polyvinyl alcohol; and
c) water.

According to another aspect the invention provides a formulation for use in the manufacture of fibre wool insulation comprising:

an aqueous anti-dusting formulation the formula comprising:
a) oil;
b) polyvinyl alcohol; and
c) water; and
a binder.

According to another aspect, the invention provides a method of preparing a glass or mineral fibre product comprising the steps of:

i) forming a solution comprising the anti-dusting formula and a binder solution, the anti dusting formula comprising:
a) oil;
b) polyvinyl alcohol; and
c) water;
ii) coating the glass or mineral fibres with the solution of anti-dusting formulation and binder solution; and
iii) forming the fibres contacted with the solution into a non-woven mat, and heating the mat to cure the binder.

According to yet another aspect, the invention provides a glass or mineral fibre product made according to the method comprising the steps of:

i) forming a solution comprising an anti-dusting formula and a binder solution, the anti-dusting formula comprising:
a) oil;
b) polyvinyl alcohol; and
c) water;
ii) coating the glass or mineral fibres with the solution of anti-dusting formulation and binder solution; and
iii) forming the fibres contacted with the solution into a non-woven mat, and heating the mat to cure the binder.

BRIEF DESCRIPTION OF THE DRAWINGS

The features of the invention will become more apparent in the following detailed description in which reference is made to the appended drawings wherein:

FIG. 1 is a photo of vials containing mixtures of a low formaldehyde emitting binder with an anti-dusting agent 24 hours after mixing. The anti-dusting agents from left to right are Dustsheild™, competitive sample "G", and sample H.

DETAILED DESCRIPTION OF THE INVENTION

In the present description, the terms listed below will be understood to have the following meanings:

"Fibre"—means any glass, mineral or other type of fibres used to manufacture insulation. Typically, glass fibres are used.

"Fibre wool"—means any wool-like insulation product made using fibres. Fibreglass and mineral wool (i.e. Rockwool™) are examples of such products.

"Anti-dusting agent" or "de-dusting agent" or "dust suppressant"—mean additives applied to the fibres to reduce, suppress or prevent dust formation during formation of the fibres or during application of the fibres at an insulation site (i.e. the walls or attic etc. of a dwelling or structure). Anti-dusting agents are known in the art and may comprise, for example, petroleum based products. As used herein, the term "anti-dusting formulation" will be understood as being a formulation comprising an anti-dusting agent along with other additives.

Stability—refers to the quality or property of an emulsion to resist separation into its components or phases.

"Binder" or "binder resin"—means a binder or binding agent used to adhere fibres together in the process of manufacturing the insulation product. Such binders are generally known to persons skilled in the art.

"eco-binder" and "eco resin" as used herein means a binder or binding agent used to adhere fibres together in the process of manufacturing the insulation product having low formaldehyde emissions or no formaldehyde emissions. This includes biding agents that do not contain formaldehyde or contain substantially less formaldehyde than standard binding agents used for the same purpose or emit less formaldehyde than a standard binding agents for the same purpose.

Three classes of binders having low or no formaldehyde emissions are:
  a) low emitting formaldehyde resins,
  b) thermosetting acrylic solution resins, and
  c) bio based resins.

Low emitting formaldehyde resins comprise partially reacted phenol formaldehyde resins known as resols (sometimes called "cooked" phenol formaldehyde). An example of a low emitting formaldehyde resin, is resin 2216-186 obtained from Arclin™, (Mississauga, Ontario).

Thermosetting acrylic solution resins include resins that are non-ionic and have a pH of about 4. An example of this type of resin is used in Formaldehyde-Free™ fiber glass from Johns Manville™.

Bio based resin include resins based on sugars or carbohydrates.

Although the three types of binders having low formaldehyde emissions described above have different chemical structures, most of these binders are acidic in nature and react with temperature to form thermoset polymers.

In general, as used herein, the term "oil" encompasses natural and synthetic compounds that may be derived from various sources as well as mixtures of such oils. For example, the oil component of the invention may comprise a petroleum hydrocarbon, a triglyceride or a blend of petroleum and triglycerides. In one aspect, the oil may comprise a hydrocarbon. In one aspect, the oil may be derived from vegetable sources. The oil may in another aspect be synthetic. In another aspect, the oil component may comprise a petroleum derived hydrocarbon such as a mineral oil.

A petroleum hydrocarbon may include a mineral oil, bright stock oil, paraffinic slack wax or petrolatum.

A triglyceride oil may include palm oil, palm kernel oil, coconut oil, peanut oil, soybean oil, soy stearine linseed oil, stearine oil, corn oil, cottonseed oil, rape seed oil, canola oil, sunflower oil, safflower oil, tung oil, castor oil, fish oil, lard, tallow, tall oil and animal fats.

According to one aspect of the invention there is provided an aqueous anti-dusting formulation for use with a binder in the manufacture of fibre wool insulation, the formula comprising:
  a) oil;
  b) polyvinyl alcohol; and
  c) water.

In a further aspect of the invention the aqueous anti-dusting formulation comprises on a w/w basis:
  a) 30%-65% of oil;
  b) 0.5%-5% of partially hydrolyzed polyvinyl alcohol; and
  c) 35%-70% water.

In a further aspect of the invention the anti-dusting formulation comprises:
  a) 30%-65% of oil selected from: a petroleum hydrocarbon, selected from a mineral oil, bright stock oil, paraffinic slack wax or petrolatum; a triglyceride selected from palm oil, palm kernel oil, coconut oil, peanut oil, soybean oil, soy stearine linseed oil, stearine oil, corn oil, cottonseed oil, rape seed oil, canola oil, sunflower oil, safflower oil, tung oil, castor oil, fish oil, lard, tallow, tall oil and animal fats, and mixtures thereof;
  b) 0.5%-5% of partially hydrolyzed polyvinyl alcohol, where the degree of hydrolysis lies in the range 78 to 93 mole %; and
  c) the balance being water.

In still a further aspect of the invention the anti-dusting formulation comprises:
  a) 52% oil;
  b) 2% of partially hydrolyzed polyvinyl alcohol, where the degree of hydrolysis lies in the range 78 to 93 mole %; and
  c) the balance being water.

According to an aspect of the invention the oil of the anti-dusting formulation is selected from the group consisting of petroleum oil, soy oil and a mixture thereof. In a particular embodiment the oil is a mixture of 15.6% (w/w) soy oil and 36.4% (w/w) petroleum oil.

In a further aspect of the invention the binder agent is a binder having low formaldehyde emissions or no formaldehyde emissions (formaldehyde free). In another aspect of the invention the binder is selected from the group consisting of low emitting formaldehyde resins, thermosetting acrylic solution resins, and bio based resins. In a further aspect the binder is a low emitting formaldehyde binder. In still a further aspect of the invention the low emitting formaldehyde binder comprises partially reacted phenol formaldehyde.

According to another aspect of the invention there is provided a formula for use in the manufacture of fibre wool insulation comprising an aqueous anti dusting formulation of the invention and a binder.

In an aspect of the invention the binder agent is a binder having low formaldehyde emissions or no formaldehyde emissions (formaldehyde free). In another aspect of the invention the binder is selected from the group consisting of low emitting formaldehyde resins, thermosetting acrylic solution resins, and bio based resins. In a further aspect of the invention the binder is a low emitting formaldehyde binder. In still a further aspect the low emitting formaldehyde binder comprises partially reacted phenol formaldehyde.

According to another aspect, the invention provides a method of preparing a glass or mineral fibre product comprising the steps of:
  i) forming a solution comprising the anti-dusting formula and a binder solution, the anti-dusting formula comprising:
    a) oil;
    b) polyvinyl alcohol; and
    c) water;
  ii) coating the glass or mineral fibres with the solution of anti-dusting formulation and binder solution; and
  iii) forming the fibres contacted with the solution into a non-woven mat, and heating the mat to cure the binder.

In a further aspect of the invention the binder solutions contains a binder having low formaldehyde emissions or no formaldehyde emissions (formaldehyde free). In another aspect of the invention the binder is selected from the group consisting of low emitting formaldehyde resins, thermosetting acrylic solution resins, and bio based resins. In a further aspect the binder is a low emitting formaldehyde binder. In still a further aspect the low emitting formaldehyde binder comprises partially reacted phenol formaldehyde.

In a further aspect of the invention the aqueous anti-dusting formulation comprises on a w/w basis:
a) 30%-65% of oil;
b) 0.5%-5% of partially hydrolyzed polyvinyl alcohol; and
c) 35%-70% water.

In a further aspect of the invention the anti-dusting formulation comprises:
a) 30%-65% of oil selected from: a petroleum hydrocarbon, selected from a mineral oil, bright stock oil, paraffinic slack wax or petrolatum; a triglyceride selected from palm oil, palm kernel oil, coconut oil, peanut oil, soybean oil, soy stearine linseed oil, stearine oil, corn oil, cottonseed oil, rape seed oil, canola oil, sunflower oil, safflower oil, tung oil, castor oil, fish oil, lard, tallow, tall oil and animal fats, and mixtures thereof;
b) 0.5%-5% of partially hydrolyzed polyvinyl alcohol, where the degree of hydrolysis lies in the range 78 to 93 mole %; and
c) the balance being water.

In still a further aspect of the invention the anti-dusting formulation comprises:
a) 52% oil;
b) 2% of partially hydrolyzed polyvinyl alcohol, where the degree of hydrolysis lies in the range 78 to 93 mole %; and
c) the balance being water.

According to an aspect of the invention the oil of the anti-dusting formulation is selected from the group consisting of petroleum oil, soy oil and a mixture thereof. In a particular embodiment the oil is a mixture of 15.6% (w/w) soy oil and 36.4% (w/w) petroleum oil.

In still a further aspect of the invention the anti-dusting formulation of the method comprises:
a) 52% oil;
b) 2% of partially hydrolyzed polyvinyl alcohol, where the degree of hydrolysis lies in the range 78 to 93 mole %; and
c) the balance being water; and
the binder solution is a low emitting formaldehyde binder resin.

In a further aspect of the invention there is provided a glass or mineral fibre product made according to the method of the invention.

Supporting Test Data

Initial screening was performed on various emulsion samples by diluting an "eco" resin having low formaldehyde emissions (Arclin resin 2216-186 obtained from Arclin, Mississauga Ontario) with water to 15% (w/w) solids to simulate a "binder solution" and adding 2 parts of an anti-dusting formulation to 98 parts of the binder solution. Samples were mixed thoroughly for 1 minute and observed after 24 hrs to determine if there is breakage and separation from the resin solution under these conditions and to determine if the mixture will remain a stable emulsion.

The following anti-dusting formulation were tested:
Norjohn's Dustshield™ formulation comprising: a) less than 90% (w/w) of a petroleum hydrocarbon, b) 30%-90% (w/w) of a triglyceride and c) 1%-10% (w/w) of a surfactant, (as described in PCT/CA2008/001777)
Formulations comprising oils with each of the following emulsifiers:
A—Rhodasurf™ LA 12—ethoxylated lauryl alcohol
B—Rhodasurf™ BC 720—tridecyl ethoxylated alcohol
C—Pluronic™ P105—di-functional block copolymer terminating in hydroxyl groups
D—Soprophor™ CY/8—ethoxylated tristyrylphenol
E—Lutensol™ AT11—alkyl polyethylene glycol ethers from fatty alcohols
F—Iconol™ 35-8—ethylene oxide adduct of a C13-C15 alcohol
Competitive sample "G" comprising an oil emulsion commercially available under the tradename Garo™ 217, available from Govi N.V.
H—Oil emulsion stabilized with partially hydrolyzed polyvinyl alcohol (PVA) sold under the tradename JL-05EY™ by Japan Vam & Poval Co. Ltd. The PVA comprised a degree of hydrolysis in the range of 82-89 mole %.

For formulations A to F and H, the oil used was a blend of petroleum and vegetable based oils, wherein the petroleum component had a flashpoint above 540° F. and the vegetable oil component was a fully refined and bleached soy oil. Formulations A to F and H contained 15.6% soy oil and 36.4% (w/w) petroleum oil for a total of 52% oils. The emulsifiers were held constant at 2% to provide a total of solids of 54%.

Surprisingly, none of the samples formed stable emulsions with the eco resin with the exception of sample H, which exhibited remarkable stability with the eco resin.

The mixtures of "eco" resin with Norjohn Dustshield, Samples A-F and Competitive Sample G were observed 24 hours after mixing. All were found to have separated at least partially.

FIG. 1 shows a photo of the samples containing a binder with DustShield™, competitive sample G and sample H (from left to right) 24 hours after mixing. The DustShield™ sample began to flocculate immediately, and was completely separated over a period of several hours. The competitive sample G also began to flocculate immediately and separated to a large degree, but had some'residual dispersed material as evidenced by the milky solution. Sample H containing PVA did not flocculate at all, and remained fully dispersed at the end of the 24 hour test.

In order to verify the stability, a 200-gram batch of binder (10% solids) was prepared as shown in Table 1 using the 2216-186 resin. The binder was stirred continuously for 24 hours at room temperature and then observed for stability. The oil emulsion referred to in Table 1 corresponds to formulation H described above.

TABLE 1

| Binder formula - 2216-186 Resin | | |
|---|---|---|
| Ingredient | Concentration | 200 g batch |
| 2216-186 Resin | 58% | 30.5 g |
| Ammonium Sulfate* | 100% | 0.5 g |
| Oil Emulsion (formulation H) | 54% | 3.25 g |
| Deionized (DI) Water | — | to 200 g |

*Ammonium sulfate is typically used as a catalyst in the fiberglass binder system.

The PVA stabilized formulation of the invention ("formulation H") remained stable after 24 hours. By comparison, a similar test was conducted using "formulation C". However, this formulation broke down with an oily layer on the surface of the binder solution after approx 6 hours.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

What is claimed is:

1. An aqueous anti-dusting oil-in-water emulsion for use in combination with a binder in the manufacture of fiber wool insulation, the oil-in water emulsion comprising:
    a) 15.6% (w/w) soy oil and 36.4% (w/w) petroleum oil;
    b) polyvinyl alcohol; and
    c) water.

2. An aqueous anti-dusting oil-in-water emulsion according to claim 1 wherein the emulsion comprises on a w/w basis:
    a) 15.6% soy oil and 36.4% petroleum oil;
    b) 0.5%-5% of said polyvinyl alcohol wherein the polyvinyl alcohol is partially hydrolyzed polyvinyl alcohol; and
    c) the balance being water.

3. An aqueous anti-dusting oil-in-water emulsion according to claim 2 wherein the partially hydrolyzed polyvinyl alcohol has a degree of hydrolysis of 78 to 93 mol %.

4. An aqueous anti-dusting oil-in-water emulsion according to claim 1 wherein the emulsion comprises on a w/w basis:
    a) 15.6% soy oil and 36.4% petroleum oil;
    b) 2% of said polyvinyl alcohol wherein the polyvinyl alcohol is partially hydrolyzed polyvinyl alcohol having a degree of hydrolysis of 78 to 93 mol %; and
    c) the balance being water.

5. An aqueous anti-dusting formulation for use in the manufacture of fiber wool insulation comprising:
    A) an oil-in-water emulsion, wherein the oil-in-water emulsion comprises
        a) oil, wherein the oil is a petroleum hydrocarbon, a triglyceride or a mixture thereof;
        b) polyvinyl alcohol; and
        c) water; and
    B) a binder, wherein the binder is an eco-binder, wherein the eco binder is
        a) a low emitting resol resin;
        b) a thermosetting acrylic solution resin or
        c) a bio based resin.

6. An aqueous anti-dusting formulation according to claim 5, wherein the eco-binder is acidic.

7. An aqueous anti-dusting formulation according to claim 5 wherein the eco-binder is a low emitting resol resin.

8. An aqueous anti-dusting formulation according to claim 5 wherein the eco-binder is a thermosetting acrylic solution resin.

9. An aqueous anti-dusting formulation according to claim 5 wherein the eco-binder is a bio based resin.

10. An aqueous anti-dusting formulation according to claim 5 wherein the oil-in-water emulsion comprises on a w/w basis:
    a) 30%-65% of oil, wherein the oil is a petroleum hydrocarbon, a triglyceride or a mixture thereof;
    b) 0.5%-5% of polyvinyl alcohol, wherein the polyvinyl alcohol is partially hydrolyzed polyvinyl alcohol; and
    c) the balance being water.

11. An aqueous anti-dusting formulation according to claim 5 wherein the oil in water emulsion comprises on a w/w basis
    a) 30%-65% of oil, wherein the oil selected from: a mineral oil, bright stock oil, paraffinic slack wax, petrolatum, palm oil, palm kernel oil, coconut oil, peanut oil, soybean oil, soy stearine, linseed oil, stearine oil, corn oil, cottonseed oil, rape seed oil, canola oil, sunflower oil, safflower oil, tung oil, castor oil, fish oil, lard, tallow, tall oil, animal fats, and mixtures thereof;
    b) 0.5%-5% of polyvinyl alcohol, wherein the polyvinyl alcohol is partially hydrolyzed polyvinyl alcohol having a degree of hydrolysis of 78 to 93 mole %; and
    c) the balance being water.

12. An aqueous anti-dusting formulation according to claim 5 wherein the oil-in-water emulsion comprises on a w/w basis
    a) 52% of oil, wherein the oil is a petroleum hydrocarbon, a triglyceride or a mixture thereof;
    b) 2% of polyvinyl alcohol, wherein the polyvinyl alcohol is partially hydrolyzed polyvinyl alcohol having a degree of hydrolysis of 78 to 93 mole %; and
    c) the balance being water.

13. A method of preparing a glass or mineral fiber product comprising the steps of:
    i) forming the aqueous anti-dusting formulation of claim 5;
    ii) coating the glass or mineral fibers with the aqueous anti-dusting formulation; and
    iii) forming the fibers coated with the aqueous anti-dusting formulation into a non-woven mat, and heating the mat to cure the binder of the aqueous anti-dusting formulation.

14. The method of claim 13 wherein the binder of the aqueous anti-dusting formulation is a low emitting resol resin.

15. A glass or mineral fiber product made according to the method of claim 13.

* * * * *